US012730618B2

(12) United States Patent
Bisht et al.

(10) Patent No.: US 12,730,618 B2
(45) Date of Patent: Sep. 8, 2026

(54) SYSTEM AND METHOD FOR IDENTIFICATION, TOKENIZATION, AND DEPENDENCY MAPPING OF SOURCE CODE IN A NETWORK ENVIRONMENT

(71) Applicant: BANK OF AMERICA CORPORATION, Charlotte, NC (US)

(72) Inventors: Abhay Bisht, Pithoragarh (IN); Sharmila Balasubramanian, Chennai (IN); Sreeram Raghavan, Chennai (IN); Maneesh Kumar Sethia, Hyderabad (IN); Manimaran Sundaravel, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 240 days.

(21) Appl. No.: 18/582,000

(22) Filed: Feb. 20, 2024

(65) Prior Publication Data

US 2025/0265054 A1 Aug. 21, 2025

(51) Int. Cl.
*G06F 8/41* (2018.01)
*G06F 8/36* (2018.01)

(52) U.S. Cl.
CPC ................ *G06F 8/433* (2013.01); *G06F 8/36* (2013.01)

(58) Field of Classification Search
CPC .................................. G06F 8/36; G06F 8/433
USPC .......................................................... 717/144
See application file for complete search history.

(56) References Cited

U.S. PATENT DOCUMENTS

| | | | | |
|---|---|---|---|---|
| 8,578,389 | B1 * | 11/2013 | Boucher | G06F 9/4494 717/148 |
| 2018/0129869 | A1 * | 5/2018 | Yu | G06V 40/169 |
| 2022/0229883 | A1 * | 7/2022 | Khandelwal | G06Q 30/0185 |
| 2023/0067033 | A1 * | 3/2023 | Gong | G06F 40/263 |
| 2023/0106226 | A1 * | 4/2023 | Bahrami | G06F 18/22 717/110 |
| 2023/0162040 | A1 * | 5/2023 | Clement | G06N 3/082 706/21 |
| 2023/0385815 | A1 * | 11/2023 | Jakobsson | G06Q 20/36 |
| 2024/0062621 | A1 * | 2/2024 | Hufnagl-Abraham | H04L 9/50 |
| 2024/0346634 | A1 * | 10/2024 | Chen | G06Q 50/265 |
| 2025/0111193 | A1 * | 4/2025 | Mallal | G06N 3/08 |
| 2025/0285171 | A1 * | 9/2025 | Siu | G06Q 30/0625 |

* cited by examiner

*Primary Examiner* — Wei Y Mui
*Assistant Examiner* — Amir Soltanzadeh
(74) *Attorney, Agent, or Firm* — Moore & Van Allen PLLC; Nicholas C. Russell

(57) ABSTRACT

Systems, computer program products, and methods are described herein for identification, tokenization, and dependency mapping of source code in a network environment. The present disclosure is configured to determine a language of the code segment, generate a feature vector by extracting features of the code segment, store the feature vector in a feature vector database comprising stored feature vectors, retrieve, from the feature vector database based on metadata of the feature vector, a plurality of similar stored feature vectors, establishing a level of similarity between the feature vector and the plurality of similar stored feature vectors, tokenizing the feature vector, and inserting the non-fungible token into a directed acyclic graph.

15 Claims, 8 Drawing Sheets

NFT

RELATIONSHIP LAYER 352

352A OWNERSHIP INFORMATION

TOKEN LAYER 354

354A TOKEN IDENTIFICATION NO.

METADATA LAYER 356

356A RESOURCE LOCATION

356B RESOURCE DESCRIPTOR

<descriptor 1>

<descriptor 2>

LICENSING LAYER 358

358A TRANSFERABILITY PARAMETERS

SYSTEM AND METHOD FOR IDENTIFICATION, TOKENIZATION, AND DEPENDENCY MAPPING OF SOURCE CODE IN A NETWORK ENVIRONMENT

TECHNOLOGICAL FIELD

Example embodiments of the present disclosure relate to a system and method for identification, tokenization, and dependency mapping of source code in a network environment.

BACKGROUND

In software development, a common challenge is the redundant creation of code for similar requirements. Despite using different programming languages, the underlying logic often remains the same, leading to wasted time and effort. There is a lack of dependable methods for reusing code while also managing licensing and attribution.

This absence of efficient code reuse mechanisms prolongs development cycles and complicates legal considerations. There is a clear need for streamlined solutions that facilitate code reuse, addressing both technical and legal aspects. Such solutions have the potential to enhance productivity and collaboration among developers, ultimately accelerating software innovation.

BRIEF SUMMARY

Systems, methods, and computer program products are provided for identification, tokenization, and dependency mapping of source code in a network environment.

In one aspect, a system for identification, tokenization, and dependency mapping of source code in a network environment is presented. The system may include a processing device, a non-transitory storage device containing instructions when executed by the processing device, causes the processing device to perform the steps of: retrieving a code segment from a code repository, determining a language of the code segment, wherein upon a first condition where the language of the code segment is known, the code segment is transformed via a transformer neural network to a common code base, generating a feature vector by extracting features of the code segment using an abstract syntax tree based neural network, wherein the feature vector is a reduced dimension, storing the feature vector in a feature vector database comprising stored feature vectors, retrieving, from the feature vector database based on metadata of the feature vector, a plurality of similar stored feature vectors, establishing, using a Euclidean distance, a level of similarity between the feature vector and the plurality of similar stored feature vectors, tokenizing, upon a third condition of the level of similarity is below a predetermined threshold, the feature vector as a non-fungible token, and inserting the non-fungible token into a directed acyclic graph as a node, wherein the directed acyclic graph comprises edges between a plurality of related nodes as a representation of dependencies between a plurality of related non-fungible tokens.

In some embodiments, upon a second condition where the language of the code segment is not known, the processing device, causes the processing device to perform the steps of pre-processing the code segment, wherein pre-processing includes processing the code segment to a predetermined input length, identifying, using a convolution neural network, the language of the code segment, wherein the convolutional neural network is a hierarchical stacked convolutional network configured to repetitively reduce the code segment and extract features at each repetition, and transforming the code segment via the transformer neural network to the common code base. In some embodiments, the directed acyclic graph represents interdependencies of a plurality of code segments.

In some embodiments, at least one of the plurality of code segments comprises a licensing attribute.

In some embodiments, upon third-party retrieval of the non-fungible token, an originator of the code segment is notified.

In some embodiments upon a fourth condition of the level of similarity being above a predetermined threshold, the code segment is not tokenized.

In some embodiments, the Euclidean distance is output from a twinning network.

In another aspect, a computer program product for identification, tokenization, and dependency mapping of source code in a network environment is presented. The computer program product may include a non-transitory computer-readable medium comprising code causing an apparatus to: retrieve a code segment from a code repository, determine a language of the code segment, wherein upon a first condition where the language of the code segment is known, the code segment is transformed via a transformer neural network to a common code base, generate a feature vector by extracting features of the code segment using an abstract syntax tree based neural network, wherein the feature vector is a reduced dimension, store the feature vector in a feature vector database comprising stored feature vectors, retrieve, from the feature vector database based on metadata of the feature vector, a plurality of similar stored feature vectors, establish, using a Euclidean distance, a level of similarity between the feature vector and the plurality of similar stored feature vectors, tokenize, upon a third condition of the level of similarity is below a predetermined threshold, the feature vector as a non-fungible token, and insert the non-fungible token into a directed acyclic graph as a node, wherein the directed acyclic graph comprises edges between a plurality of related nodes as a representation of dependencies between a plurality of related non-fungible tokens.

In some embodiments, upon a second condition where the language of the code segment is not known, the code may further cause the apparatus to pre-process the code segment, wherein pre-processing includes processing the code segment to a predetermined input length, identify, using a convolution neural network, the language of the code segment, wherein the convolutional neural network is a hierarchical stacked convolutional network configured to repetitively reduce the code segment and extract features at each repetition, and transform the code segment via the transformer neural network to the common code base.

In some embodiments, the directed acyclic graph represents interdependencies of a plurality of code segments.

In some embodiments, at least one of the plurality of code segments comprises a licensing attribute.

In some embodiments, upon third-party retrieval of the non-fungible token, an originator of the code segment is notified.

In some embodiments upon a fourth condition of the level of similarity being above a predetermined threshold, the code segment is not tokenized.

In some embodiments, the Euclidean distance is output from a twinning network.

In yet another aspect, a method for identification, tokenization, and dependency mapping of source code in a network environment is presented. The method may include retrieving a code segment from a code repository, determining a language of the code segment, wherein upon a first condition where the language of the code segment is known, the code segment is transformed via a transformer neural network to a common code base, generating a feature vector by extracting features of the code segment using an abstract syntax tree based neural network, wherein the feature vector is a reduced dimension, storing the feature vector in a feature vector database comprising stored feature vectors, retrieving, from the feature vector database based on metadata of the feature vector, a plurality of similar stored feature vectors, establishing, using a Euclidean distance, a level of similarity between the feature vector and the plurality of similar stored feature vectors, tokenizing, upon a third condition of the level of similarity is below a predetermined threshold, the feature vector as a non-fungible token, and inserting the non-fungible token into a directed acyclic graph as a node, wherein the directed acyclic graph comprises edges between a plurality of related nodes as a representation of dependencies between a plurality of related non-fungible tokens.

In some embodiments, upon a second condition where the language of the code segment is not known, the processing device, causes the method may further include processing the code segment to a predetermined input length, identifying, using a convolution neural network, the language of the code segment, wherein the convolutional neural network is a hierarchical stacked convolutional network configured to repetitively reduce the code segment and extract features at each repetition, and transforming the code segment via the transformer neural network to the common code base.

In some embodiments, the directed acyclic graph represents interdependencies of a plurality of code segments.

In some embodiments, at least one of the plurality of code segments comprises a licensing attribute.

In some embodiments, upon third-party retrieval of the non-fungible token, an originator of the code segment is notified.

In some embodiments upon a fourth condition of the level of similarity being above a predetermined threshold, the code segment is not tokenized.

In some embodiments, the Euclidean distance is output from a twinning network.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the Figures may or may not be present in certain embodiments described herein. Some embodiments may include fewer (or more) components than those shown in the Figures.

Figure 1A:
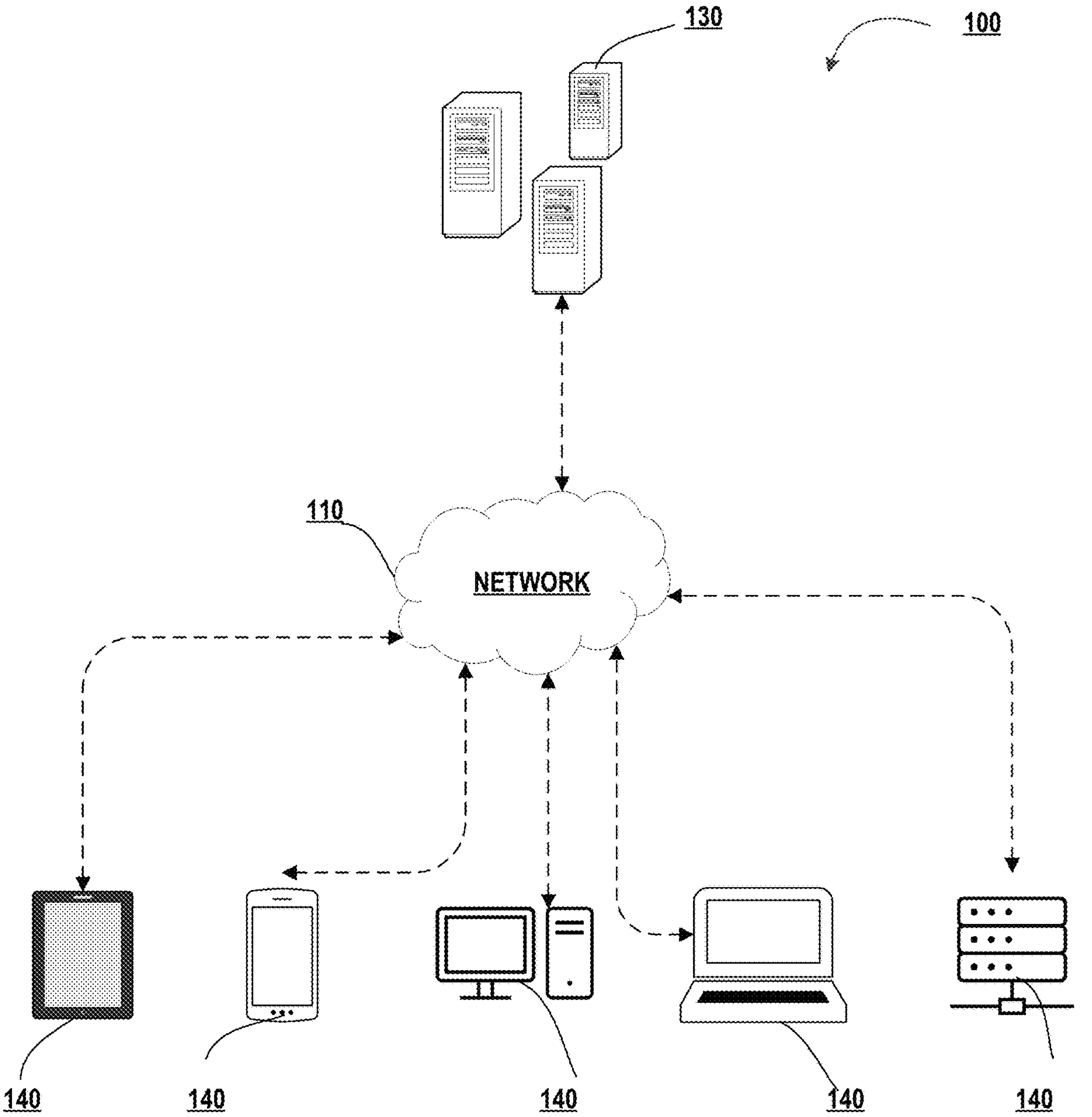
Figure 1B:
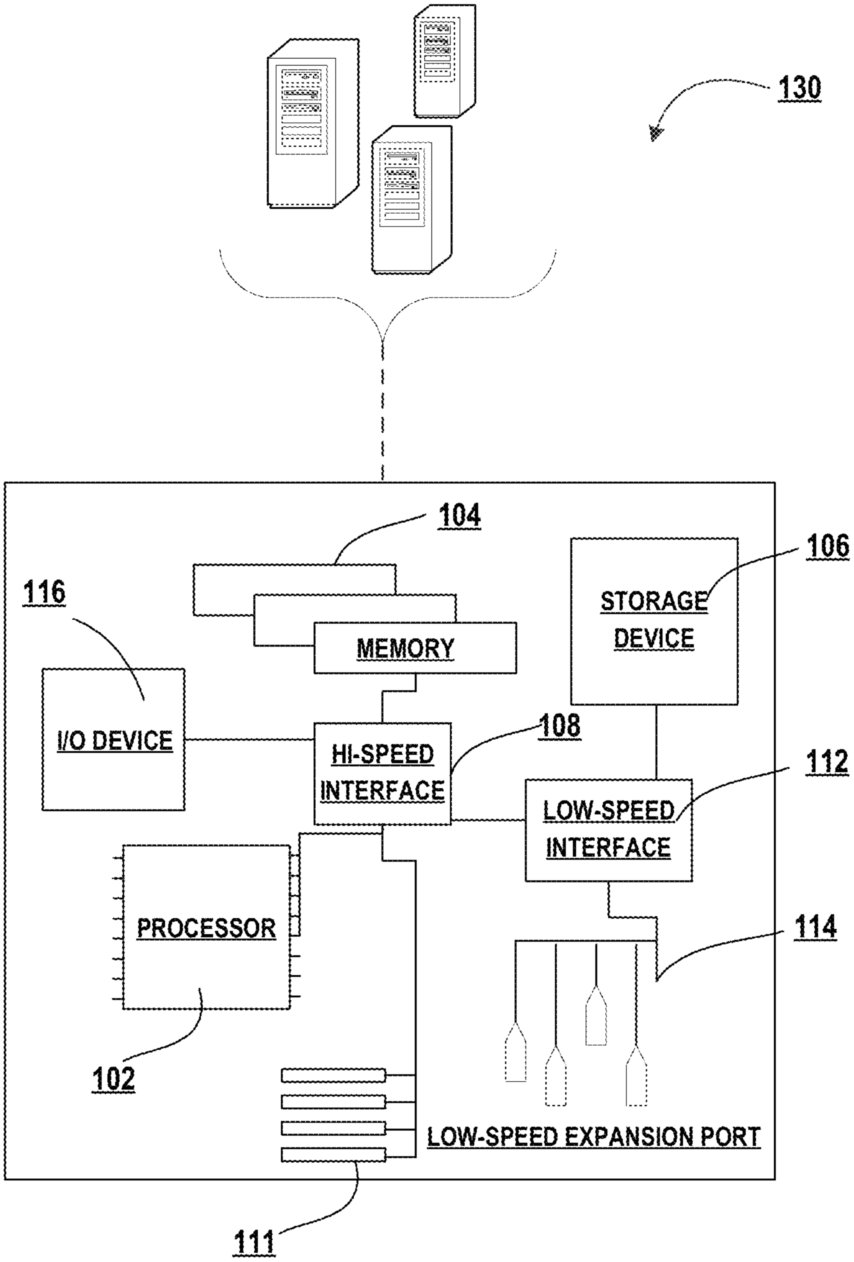
Figure 1C:
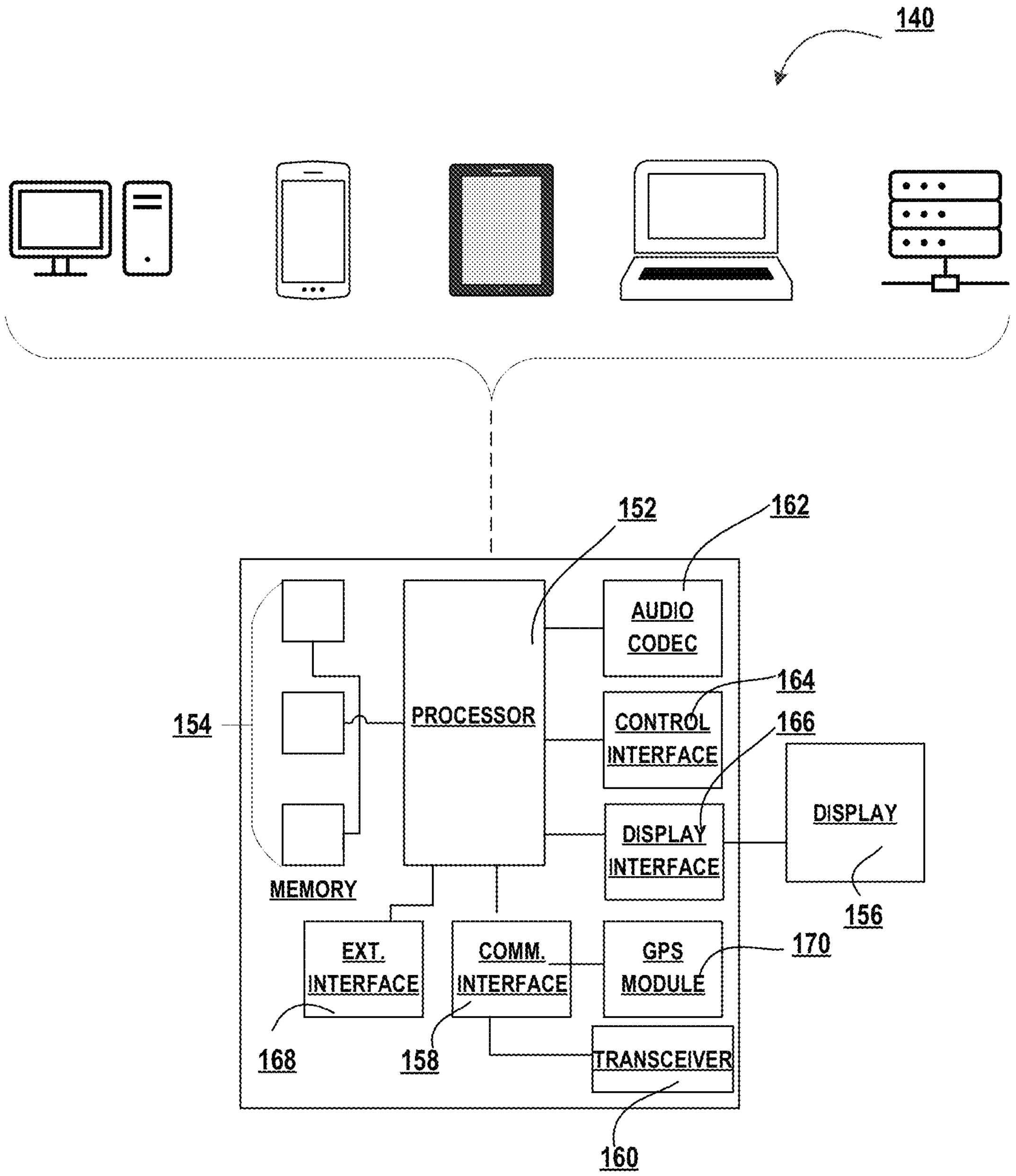
Figure 2:
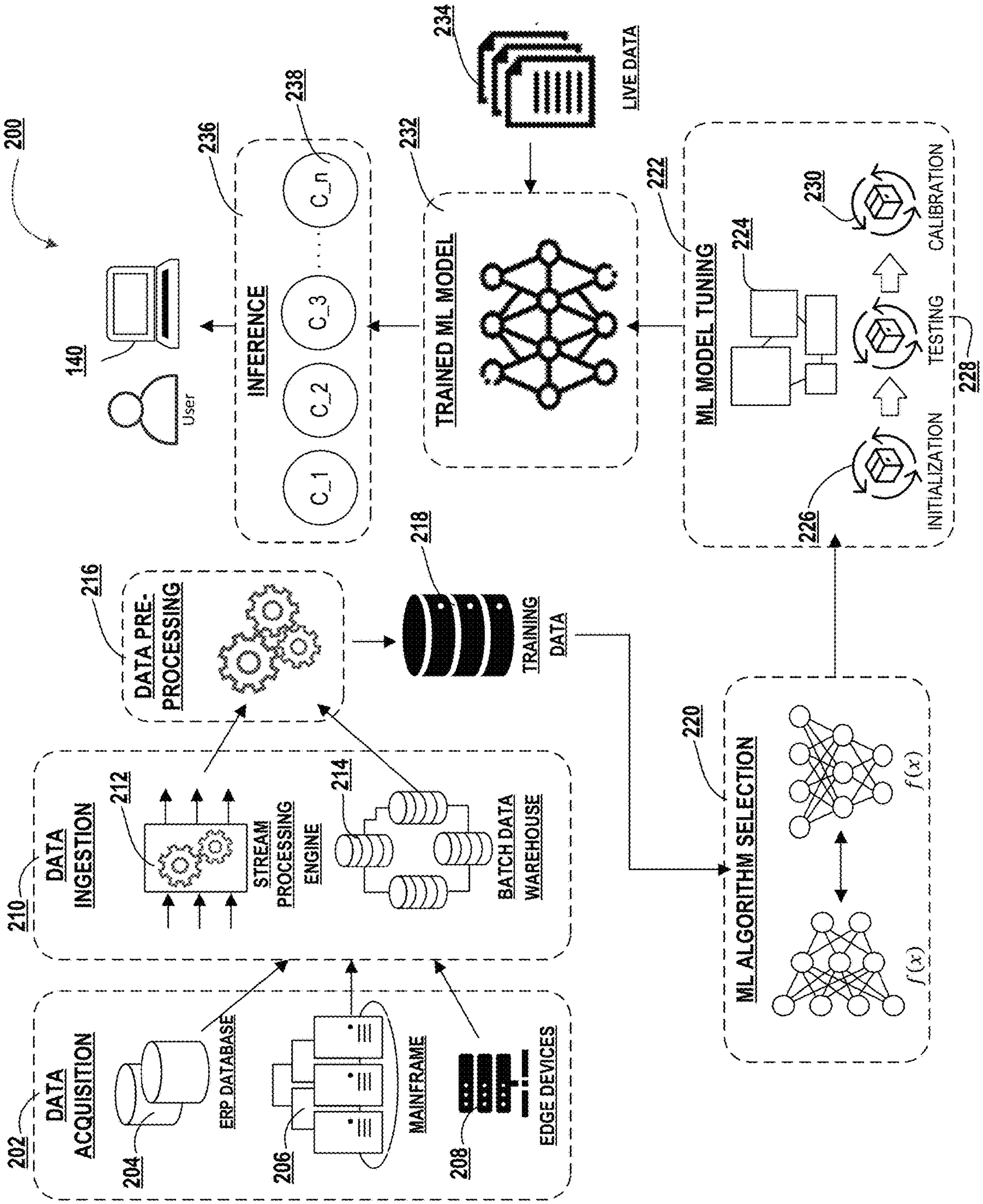
Figure 3A:
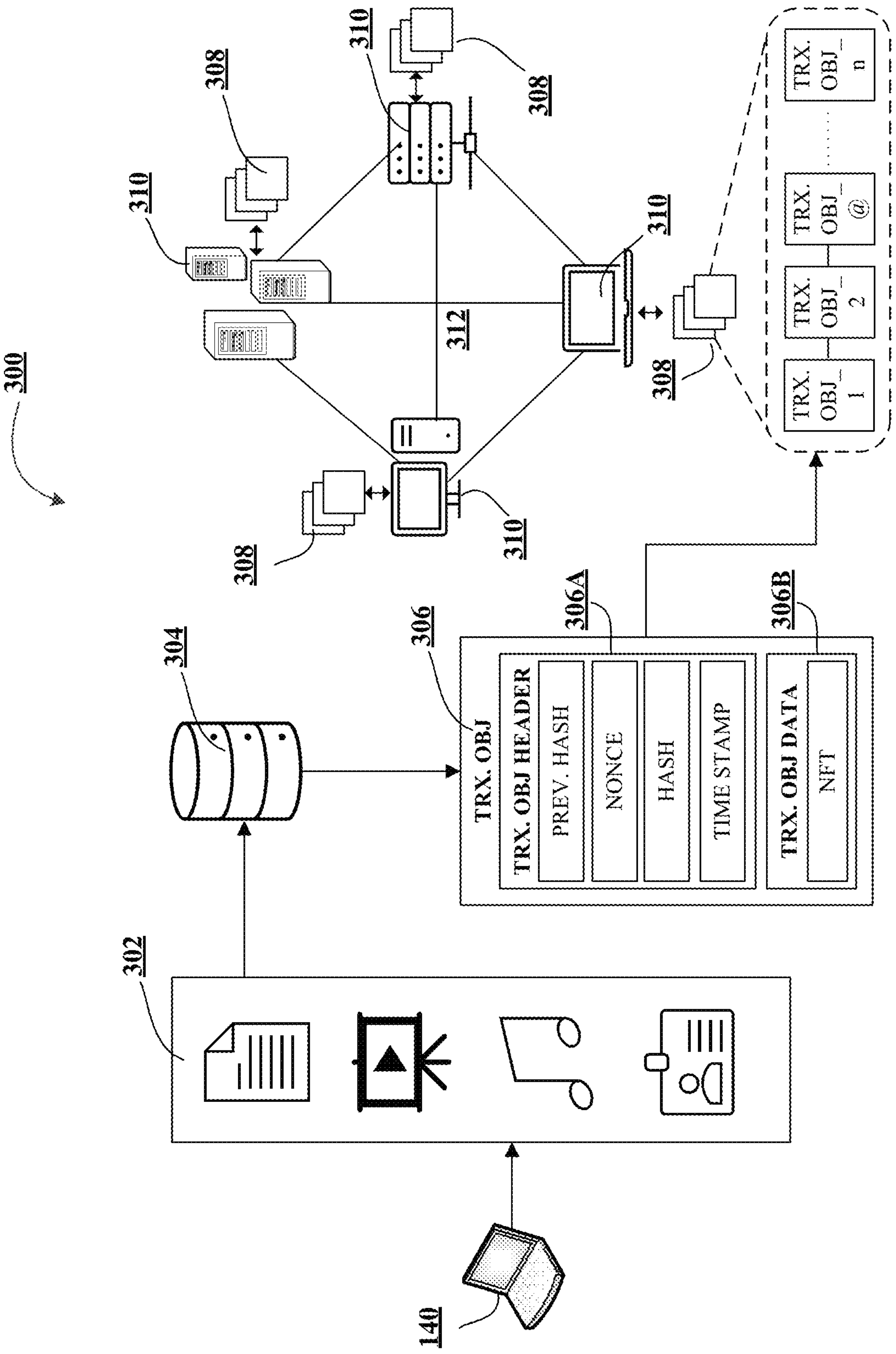
Figure 3B:
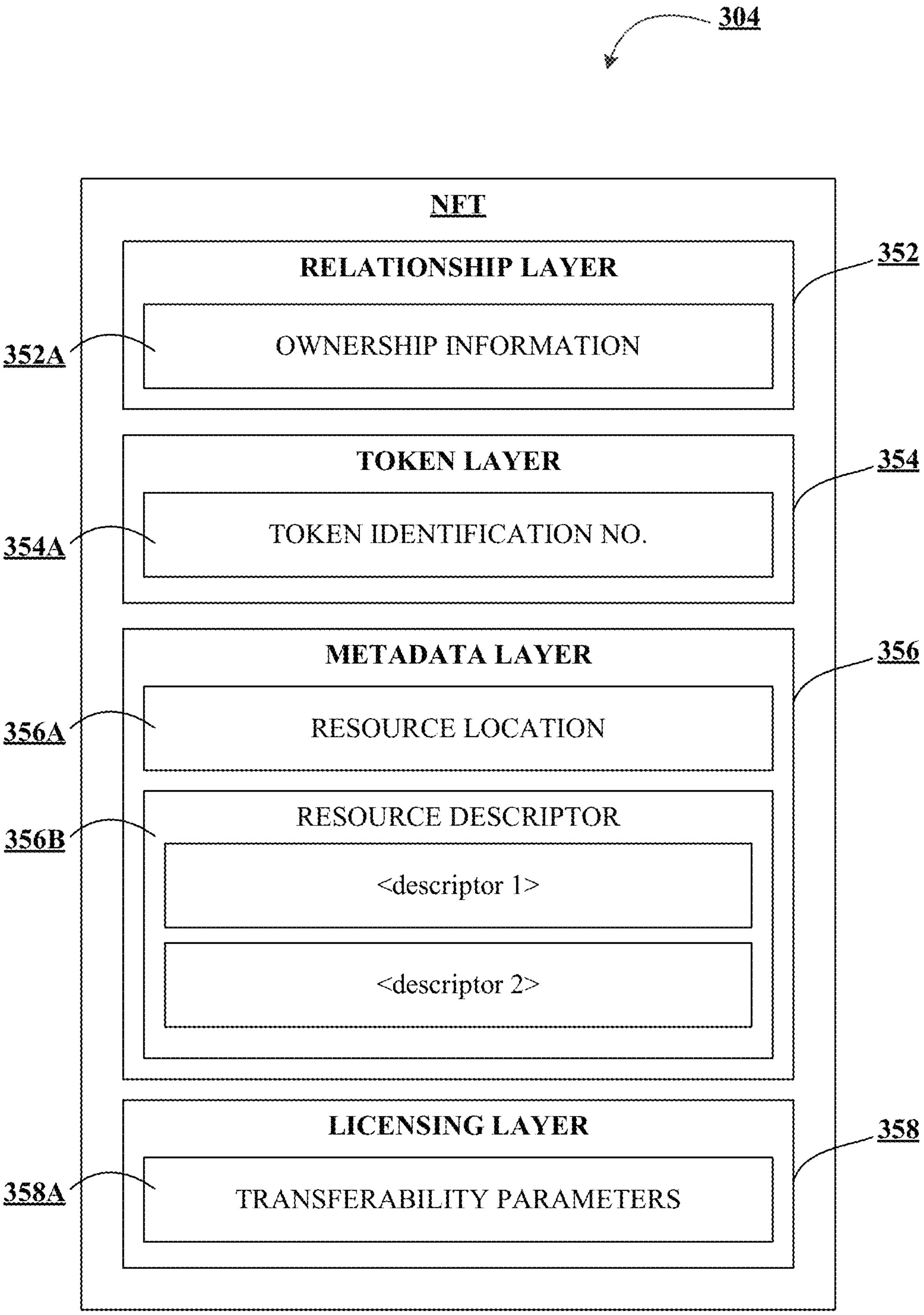
Figure 4:
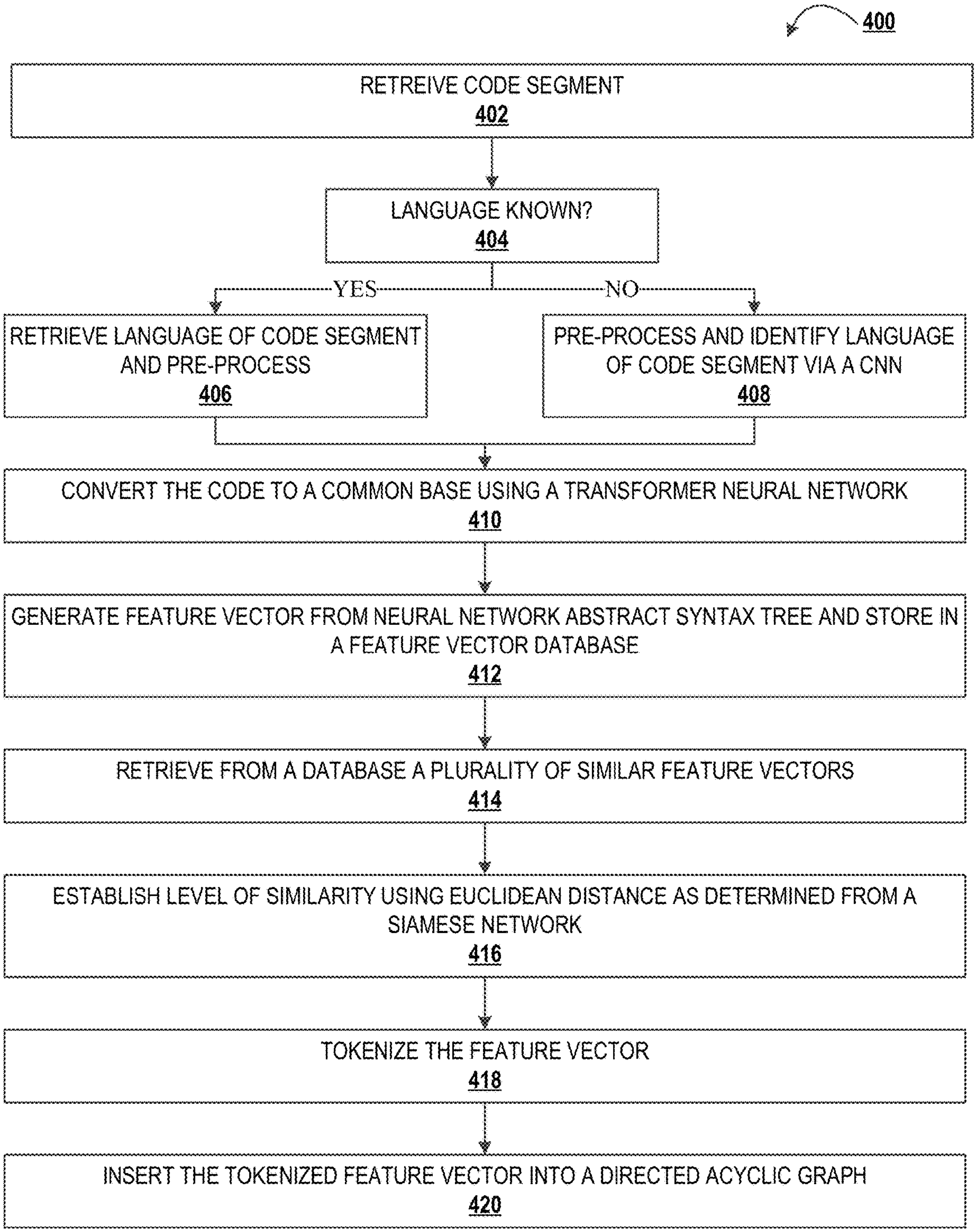
Figure 5:
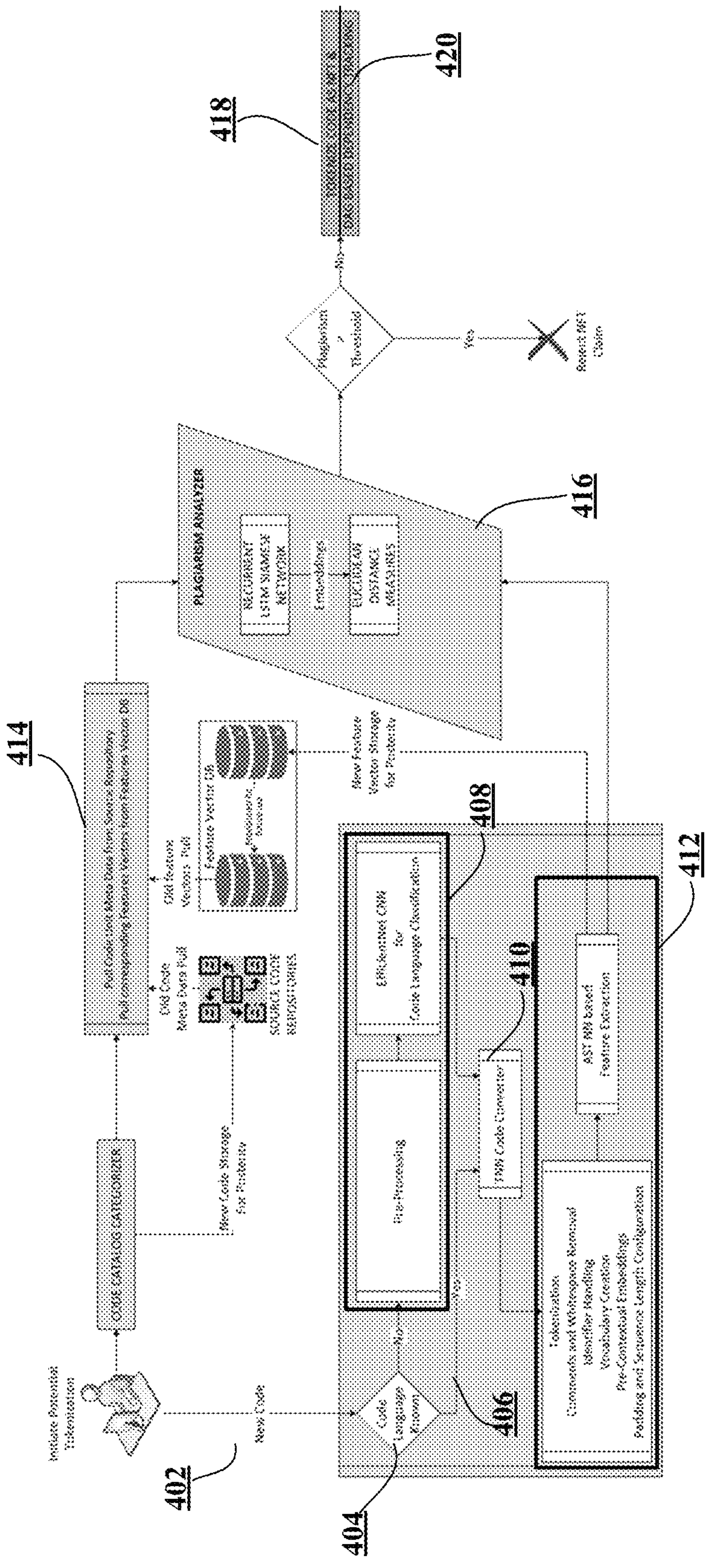

FIGS. 1A-1C illustrates technical components of an exemplary distributed computing environment for identification, tokenization, and dependency mapping of source code in a network environment, in accordance with an embodiment of the disclosure;

FIG. 2 illustrates an exemplary machine learning (ML) subsystem architecture, in accordance with an embodiment of the disclosure;

FIG. 3A illustrates an exemplary process of creating an NFT, in accordance with an embodiment of the disclosure;

FIG. 3B illustrates an exemplary as a multi-layered documentation of a resource, in accordance with an embodiment of the disclosure;

FIG. 4 illustrates a process flow for identification, tokenization, and dependency mapping of source code in a network environment, in accordance with an embodiment of the disclosure; and FIG. 5 illustrates a flowchart for identification, tokenization, and dependency mapping of source code in a network environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "transformer neural network" may refer to a type of artificial neural network architecture that utilizes self-attention mechanisms to weigh the significance of different input elements when processing sequential data. Unlike traditional recurrent neural networks (RNNs) or convolutional neural networks (CNNs), transformer neural networks do not rely on sequential processing, allowing for parallelization and more efficient training on large datasets.

As used herein, a "hierarchical stacked convolutional network" may refer to a specialized neural network architecture designed for processing hierarchical data structures, particularly suited for tasks involving hierarchical relationships or multi-scale representations. This network architecture comprises multiple layers of convolutional operations stacked hierarchically, wherein each layer captures and abstracts features at different levels of granularity. Through the hierarchical arrangement of convolutional layers, the network can effectively learn hierarchical representations of input data, enabling it to discern complex patterns and relationships across various scales.

As used herein, a "twinning network" may refer to a distributed system architecture comprising interconnected nodes or entities designed to replicate and synchronize data or processes across multiple instances or locations in a parallel and coordinated manner. These networks are characterized by their ability to efficiently handle tasks such as data replication, load balancing, fault tolerance, and scalability through the coordinated efforts of constituent nodes. Twinning networks leverage sophisticated algorithms and communication protocols to ensure seamless coordination and consistency among distributed components, thereby enhancing system dependability and performance in various applications such as distributed databases, content delivery networks, cloud computing environments, and peer-to-peer networks.

One of the predominant challenges faced by developers lies in the redundant creation of code to fulfill similar or identical requirements. Despite the proliferation of various programming languages and methodologies, the underlying logic driving many software functionalities remains inherently consistent across projects. This redundancy not only squanders valuable time and resources but also perpetuates inefficiencies within the development process. Consequently, there is a pressing need for a systematic approach to mitigate these challenges and facilitate code reuse on a broader scale.

A key obstacle to effective code reuse is the lack of a standardized mechanism for identifying, accessing, and integrating existing code modules into new projects. Developers often resort to reinventing the wheel, unaware of pre-existing solutions or unable to navigate the complexities of disparate code repositories. Moreover, concerns regarding licensing compatibility and intellectual property rights further hinder the adoption of reusable code, as developers must navigate legal constraints to ensure compliance and mitigate any chance of infringement.

Addressing these challenges necessitates the establishment of a framework that improves the discovery, evaluation, and integration of reusable code segments (e.g., code snippets). The solution must safeguard the interests of both code contributors and consumers. Such a framework should incorporate robust mechanisms for code repository management, and licensing attribution to allow for transparency, accountability, and trust within the developer community. Such a framework may motivate code sharing and reward contributors for their contributions to the collective knowledge base.

Accordingly, the solution to the aforementioned shortcomings is presented herein implements a methodology for categorizing and evaluating code segments against similar code segments to determine the level of uniqueness of a given code segment compared to others. Furthermore, the solution presented herein allows for the storage of code segments as non-fungible tokens of a directed acyclic graph, the directed acyclic graph providing traceability into the source of a code segment, and various dependencies the code segment may have, such as to provide for proper licensing and attribution thereof.

Indeed, the present disclosure embraces a system, computer program product, and method that includes determining the language of a code segment, and, if the language of the code segment is known, processing the code segment with a transformer neural network such as to trim the code segment to a standardized length, as well as other parameters. If the language of the code segment is not known, a hierarchical stacked convolution neural network may be used to identify the language of the code segment by repetitive reduction of the code segment and feature extraction prior to processing the code segment with a transformer neural network.

To reduce the complexity of the code segment and allow for rapid comparison with other code segments, features of the code segment may be extracted using an abstract syntax tree of a neural network, then generating a feature vector to represent the code segment. This feature vector may be stored alongside other feature vectors in a database. Once a new feature vector is created based on a code segment, the present disclosure may establish the similarity of this new feature vector compared to existing feature vectors in the database. This may be accomplished by measuring the Euclidean distance between the feature vectors. A small distance below a predetermined threshold may indicate some plagiarism of source code, while a larger distance above the predetermined threshold may indicate a level of uniqueness to the source code. A feature vector meeting the defined similarity criteria may be tokenized into a non-fungible token and inserted into a directed acyclic graph, where it is represented as a node, with edges between nodes representing dependencies between the feature vectors, and, by implication, the underlying source code. In doing so, originators of code segments may be notified when their code segments are subsequently used by others, or various licensing attributes may be provided to engage in contractual transactions, as will be discussed in greater detail herein.

What is more, the present disclosure provides a technical solution to a technical problem. As described herein, the technical problem includes redundant creation of code due to the lack of a standardized mechanism for identifying, accessing, and integrating existing code modules into new projects. The technical solution presented herein fundamentally changes the way in which code segments are shared across various platforms and entities, by evaluating uniqueness of the code segment and securing the code segments in a directed acyclic graph. The present disclosure embraces an improvement over existing solutions to sharing source code between users (i) with fewer steps to achieve the solution, thus reducing the amount of network resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving network resources, (iv) determining an optimal amount of resources that need to be used to implement the solution, thus reducing network traffic and load on existing network resources. Furthermore, the technical solution described herein uses a rigorous, computerized process to perform specific tasks and/or activities that were not previously performed. In specific implementations, the technical solution bypasses a series of steps previously implemented, thus further conserving network resources.

FIGS. 1A-1C illustrate technical components of an exemplary distributed computing environment 100 for identification, tokenization, and dependency mapping of source code in a network environment, in accordance with an embodiment of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model to form a trained machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It shall be understood that the embodiment of the machine learning subsystem 200 illustrated in FIG. 2 is exemplary and that other embodiments may vary. As another example, in some embodiments, the machine learning subsystem 200 may include more, fewer, or different components.

An NFT is a cryptographic record (referred to as "tokens") linked to a resource. An NFT is typically stored on a distributed ledger that certifies ownership and authenticity of the resource, and exchangeable in a peer-to-peer network.

FIG. 3A illustrates an exemplary process 300 of creating an NF, in accordance with an embodiment of the invention. As shown in FIG. 3A, to create or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, virtual world items, videos, real-world items such as artwork and real estate, or any other presumed valuable object. These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce-a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 304 is considered signed and forever tied to its nonce and hash. The transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and end-point device(s) 140. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer B1 from a seller S1, the relationship between B1 and S1 as a buyer-seller is recorded in the relationship layer 352. In another example, if the NFT 304 is owned by O1 and the resource itself is stored in a storage facility by storage provider SP1, then the relationship between 1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain, i.e., directly on the distributed ledger 308 along with the NFT 304, or off-chain, i.e., in an external storage location. The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

FIG. 4 illustrates a flowchart 400 for identification, tokenization, and dependency mapping of source code in a network environment, in accordance with an embodiment of the disclosure. FIG. 5 illustrates a flowchart for identification, tokenization, and dependency mapping of source code in a network environment, in accordance with an embodiment of the disclosure. References to numerals in the following description may be made to both FIGS. 4 and 5. As illustrated in FIG. 4, the process may begin at block 402 where the system 130 retrieves a code segment from a code repository. In some embodiments, code segments may be provided to one or more endpoint devices through an integrated development environment and subsequently stored in a code repository, which may take the form of one or more storage devices. In other embodiments, code segments may be pre-existing (e.g., previously stored) in the code repository.

In some embodiments, once a code segment has been stored in a code repository, the process steps described hereinafter may occur without any input from the endpoint device or any user through the endpoint device. Indeed, the process flow may occur autonomously. In some embodiments, the process flow may occur autonomously as a result of triggering from receiving the code segment in the code repository. Additionally, or alternatively, the process flow may occur autonomously at a predetermined interval, such as every 5 minutes, every 30 minutes, every 60 minutes, every 12 hours, every 24 hours, and so forth.

However, in some embodiments, the process flow may occur as a result of being triggered at an endpoint device. For example, prior to, during, or after saving a code segment in a code repository, a user at an endpoint device may indicate via a selection on the user interface that the user wishes for the code segment to be analyzed in accordance with the process flow outlined herein.

Next, at block 404, the system 130 may determine if the programming language of the code segment is known. If it is, then at block 406 the system 130 may retrieve a language (i.e., programming language) of the code segment. It shall be appreciated that code segments may be written in a variety of languages, including, but not limited to, JavaScript, Python, Java, C++, C#, Ruby, PHP, Swift, Objective-C, Kotlin, TypeScript, HTML, CSS, and so forth. Each programming language has its own syntax, features, and ecosystem. In some embodiments, the programming language of a code segment may be known based on the programming environment on which it originates, the filetype of the code segment, or the like. Filetypes include plain text files for languages such as C, C++, Java, Python, and others. Code segments may also be denoted by extensions like .c, .cpp, java, .py, .rb, .html, css, and .js. Script files, such as those with extensions .py, .pl, .sh, and .bat, markup files, including .html, .xml, .svg, and .markdown, configuration files (.json, .yaml, .ini, .cfg, .properties), compiled files (.exe, .dll, .so, .class, .jar) database files (.sql, .db, .sqlite, .mdb) for scripts for database operations, and so forth.

Alternatively, the programming language of a code segment may be identified at an endpoint device on which the code segment originates, such as by a user providing the system 130 with the programming language before storing of the code segment in the code repository.

Regardless, the system 130 may enter a first condition such that the language of the code segment is known, and the code segment is subsequently processed via a transformer neural network (i.e., the "TNN" or "code converter") to process the code segment, as will be described in more detail herein.

However, in some instances, the programming language of the code segment may not be known. This may occur if the code segment is obfuscated or heavily customized and therefore does not conform to the typical syntax patterns recognized by system 130. Alternatively, the programming language of the code segment simply may not have been provided by a user to the system 130. Furthermore, language variants, dialects, or regional variations can also confuse the system 130, since comments within the code or variable names may vary based on a rare spoken language. Additionally, errors in the code itself, such as missing or malformed headers or declarations, may prevent the system 130 from accurately knowing/identifying the programming language. Indeed, numerous scenarios exist where the programming language of the code segment may be unknown to the system 130.

Thus, in such instances of not knowing the programming language, the process may proceed at block 408 where the system 130 implements a convolution neural network ("CNN") to identify the language of the code segment. In some embodiments, the convolution neural network is one embodiment of a machine learning model 232, where a hierarchical stacked convolution neural network is implemented for code language classification.

In some embodiments, prior to being provided to the CNN, the code segment may be pre-processed to primarily set the length of what will be input to the CNN. To do so, the system 130 may adjust the length of logical segments of the code segment so that the lengths get padded to a uniform length. In some embodiments, the code segment is tokenized, and encoded into numerical vectors.

The convolutional neural network may receive the pre-processed code segment as an input, and repetitively reduces the code segment in size and extracts features at each repetition. The CNN works based on a matrix of a predetermined dimension getting convolved over and over till it arrives at a unidimensional or a one-dimensional (i.e., unidimensional) matrix. When a unidimensional matrix is ultimately obtained, all of the essential features of the code segment have all been extracted. As a result, the feature vector (unidimensional matrix) is obtained, which helps the CNN to classify the entire code segment into which language it may be. To accomplish this, the CNN has been previously trained using tagged datasets of feature vectors having known programming languages to identify features, and based upon the features identified, identify the language in which this code segment is written.

Continuing at block 410, the classification or determination of language type, either by the process of block 408 or the process of block 406, may then be provided to a transformer neural network ("code converter") to convert the code segment to a common code base. The transformer neural network is another embodiment of a machine learning model 232. Initially, the code may be tokenized into segments, which may then be processed through multiple layers of self-attention and feedforward neural networks. During training, the transformer neural network model learns to associate corresponding elements between different code bases by attending to relevant context and relationships within the code. Through this process, the transformer gradually acquires the ability to accurately translate source code into a common code base.

The converted code from the transformer neural network may then be pre-processed prior to continuing with the remainder of the process flow. Pre-processing may include tokenizing the code segment by breaking it down into individual tokens, representing elements such as keywords, operators, and identifiers. Comments and white space may be removed to focus solely on the functional components of the code segment. Specific identifiers may be determined and tagged. Vocabulary and syntax rules may be established that map each unique token to a numeric identifier. Word embedding may also be performed during pre-processing to associate each word in the vocabulary with a dense vector representation. Finally, padding may be applied to ensure all code segments reach a uniform predetermined length by truncating or zero-padding the sequences.

Next, as shown at block 412, the system 130 may generate a feature vector by extracting features of the code segment using an abstract syntax tree based neural network. As used herein, an "abstract syntax tree" may refer to a hierarchical data structure used to represent the syntactic structure of source code for a code segment. The abstract syntax tree based neural network may be another embodiment of the machine learning model 232. The abstract syntax tree based neural network is it is a pre-trained machine learning model 232 that can identify features specific to a particular programming language. Such features may include, but are not limited to, keywords, impact areas, and portions of the code segment that may be ignored. An abstract syntax tree has an efficient means for semantic analysis, code clone detection, and feature location and extraction such as to prevent the loss of viable features during feature extraction. The nodes of the abstract syntax tree may represent elements of the code segment, while edges connect "parent" and "child" nodes in a manner as to represent the relationship between the various elements of the code segment. Feature extraction includes reducing the code segment into a smaller dimension (i.e., reduced dimension) and retaining only the essential features, where it is represented and stored as a feature vector. The abstract syntax tree captures the essential elements of code syntax without detailing specific formatting or textual representation for processes such as compilation, optimization, and analysis.

The abstract syntax tree neural network extracts the features and that in turn will be fed to a code recreation engine, which will recreate the original code segment based on the extracted features. That recreated code segment will be compared to the original. If the extracted features are able to recreate the original code segment (e.g., the error/mismatch between the original code segment and the recreated code segment is below a predetermined threshold). If the recreated code segment is above this predetermined threshold of error, the abstract syntax tree may repetitively perform the cycle, until such time that the features are extracted to successfully extract all of those features which are required to recreate the code segment.

The feature vector may then be stored in a feature vector database. In some embodiments, this feature vector database may include stored feature vectors irrespective of whether there is a certain amount of similarity between existing code or not. Every feature vector generated by the abstract syntax tree neural network may be saved in the feature vector database.

Next, at block 414, the system 130 may retrieve from the feature vector database, based on metadata of the feature vector, a one or more similar stored feature vectors. Using basic feature identification from the metadata for the feature vector, the similar feature vectors which have similar functionalities are identified. This may include identifying feature vectors with similar feature names, scaling information, feature importance/relevance, and so forth.

Continuing at block 416, the system 130 may establish, using a Euclidean distance, a level of similarity between the feature vector and the one or more similar stored feature vectors in an analyzer module. First, one or more of the similar stored feature vectors may be sent to the analyzer module, along with the feature vector generated for the instant code segment in block 412. The analyzer module may contain a twinning network such as a Siamese network that recurringly analyzes the same data sets using recurrent neural networks. The Siamese network, having two identical subnetworks, one of which receives the instant code segment from block 412, while the other subnetwork receives a similar stored feature vector from the feature vector database. Once these inputs are encoded, the outputs from each of the subnetworks will be able to be compared to identify and establish the degree of similarity in the code segments (represented by the feature vectors) passed to the two different networks. As a result of this comparison, a Euclidean distance (or in some embodiments cosine similarity) between the outputs is measured, which identifies the distance between two sets of data.

It shall be appreciated that a Euclidean distance of a small value (e.g., below a predetermined threshold) may indicate that the two code segments compared in block 416 are very similar, while a Euclidean distance of a larger value (e.g., above a predetermined threshold) may indicate that the two code segments compared in block 416 are not similar. In this way, the present disclosure embraces the use of such Euclidean distance measurements to determine the presence of any plagiarism, such as to prevent redundant or largely redundant code segments from being used in the process steps further outlined herein. Namely, this may prevent a programmer from plagiarizing, either inadvertently or on purpose, code segment(s) that the programmer themselves did not author.

Next, at block 418, the system 130 may tokenize, upon a third condition of the level of similarity is below a predetermined threshold, the feature vector as a non-fungible token 304. If the system 130 has determined that the code segment is unique enough (e.g., the Euclidean distance above the predetermined threshold), the feature vector is memorialized as an NFT 304. In some embodiments, a tokenizing agent may be used to generate the NFT 304. However, if upon a fourth condition where the level of similarity between the code segments as determined by the Euclidean distance is above the predetermined threshold, the code segment is not tokenized to be memorialized as an NFT 304.

It shall be appreciated that code segments often do not exist in an isolated environment. Instead, some code segments depend on other code segments for any given script. Accordingly, maintaining such interdependencies of the code segments may be beneficial and allow for these various dependencies/interdependencies to be determined and/or visualized. Accordingly, at block 420, the system 130 may insert the non-fungible token 304 into a directed acyclic graph as a node.

As used herein, a "directed acyclic graph" or "DAG" may refer to a data structure having nodes connected by directed edges, where each edge points from one node to another, and there are no cycles present in the graph. A directed acyclic graph may be used to model and/or visualize relationships between various code segments represented as blocks as an alternative to traditional blockchains. DAG-based blockchain systems eliminate the concept of "blocks" and the associated mining process and instead, transactions are directly appended to the DAG as they are validated, forming a mesh-like structure of interconnected code segments. In a DAG, each new transaction has to reference previous transactions before getting accepted into the network. This structure theoretically makes DAGs more scalable and efficient than traditional blockchains, as it allows for faster transaction processing and lower costs.

The directed acyclic graph may include a plurality of nodes, each node representing a feature vector in the form of an NFT 304, and edges between nodes therefore represent dependencies/interdependencies between a plurality of related NTFs, and, as a result, dependencies/interdependencies between code segments. In some embodiments, edges can be established between multiple nodes.

In some embodiments, a developer may provide the system 130 with dependency/interdependency information (e.g., the different dependencies/interdependencies required for the code segment to function properly) for use in the directed acyclic graph.

In some embodiments, at least one of the plurality of code segments may include a licensing attribute as a result of the licensing attribute being embedded in the NFT 304 as license information of the smart contract of the NFT 304 of the directed acyclic graph.

The licensing agreement may include rights granted to a buyer, licensee, seller, and so forth, as well as revenue sharing or royalty payment arrangements. Licensing terms may be embedded directly into the metadata of the smart contract. In some embodiments, the licensing attribute may be such that the code segment is open source and may be used freely.

Furthermore, in some embodiments, upon a third-party retrieving, using, or licensing a particular NFT 304 that contains such a smart contract, an originator of the code segment underlying the NFT 304 may be notified. Such notification may be accomplished through the use of external services or platforms such as blockchain oracles to trigger notifications upon meeting certain conditions of the smart contract licensing agreement of the NFT 304. Information regarding the usage of the code segment may therefore automatically be relayed to this person. In some embodiments, code segment usage may be tracked for purposes of billing.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identification, tokenization, and dependency mapping of source code in a network environment, the system comprising:

a processing device;

a non-transitory storage device containing instructions when executed by the processing device, causes the processing device to perform the steps of:

retrieving a code segment from a code repository;

determining a language of the code segment, wherein upon a first condition where the language of the code segment is known, the code segment is transformed via a transformer neural network to a common code base;

generating a feature vector by extracting features of the code segment using an abstract syntax tree based neural network, wherein the feature vector is a reduced dimension;

storing the feature vector in a feature vector database comprising stored feature vectors;

retrieving, from the feature vector database based on metadata of the feature vector, a plurality of similar stored feature vectors;

establishing, using a Euclidean distance, a level of similarity between the feature vector and the plurality of similar stored feature vectors;

tokenizing, upon a third condition of the level of similarity is below a predetermined threshold, the feature vector as a non-fungible token; and inserting the non-fungible token into a directed acyclic graph as a node, wherein the directed acyclic graph comprises edges between a plurality of related nodes as a representation of dependencies between a plurality of related non-fungible tokens, wherein the edges represent code segment dependency relationships between underlying code segments associated with the related non-fungible tokens, wherein the directed acyclic graph represents interdependencies of a plurality of code segments, and wherein at least one of the plurality of code segments comprises a licensing attribute embedded in metadata of the non-fungible token corresponding to the at least one code segment.

2. The system of claim 1 wherein, upon a second condition where the language of the code segment is not known, the processing device, causes the processing device to perform the steps of:

pre-processing the code segment, wherein pre-processing includes processing the code segment to a predetermined input length by tokenizing the code segment and padding or truncating a sequence of tokens to the predetermined input length;

identifying, using a convolution neural network, the language of the code segment, wherein the convolution neural network is a hierarchical stacked convolution network configured to repetitively reduce the code segment and extract features at each repetition; and transforming the code segment via the transformer neural network to the common code base.

3. The system of claim 1, wherein upon third-party retrieval of the non-fungible token, an originator of the code segment is notified.

4. The system of claim 1, wherein upon a fourth condition of the level of similarity being above a predetermined threshold, the code segment is not tokenized.

5. The system of claim 1, wherein the Euclidean distance is output from a twinning network.

6. A computer program product for identification, tokenization, and dependency mapping of source code in a network environment, the computer program product comprising a non-transitory computer-readable medium comprising code causing an apparatus to:

retrieve a code segment from a code repository;

determine a language of the code segment, wherein upon a first condition where the language of the code segment is known, the code segment is transformed via a transformer neural network to a common code base;

generate a feature vector by extracting features of the code segment using an abstract syntax tree based neural network, wherein the feature vector is a reduced dimension;

store the feature vector in a feature vector database comprising stored feature vectors;

retrieve, from the feature vector database based on metadata of the feature vector, a plurality of similar stored feature vectors;

establish, using a Euclidean distance, a level of similarity between the feature vector and the plurality of similar stored feature vectors;

tokenize, upon a third condition of the level of similarity is below a predetermined threshold, the feature vector as a non-fungible token; and insert the non-fungible token into a directed acyclic graph as a node, wherein the directed acyclic graph comprises edges between a plurality of related nodes as a representation of dependencies between a plurality of related non-fungible tokens, wherein the edges represent code segment dependency relationships between underlying code segments associated with the related non-fungible tokens, wherein the directed acyclic graph represents interdependencies of a plurality of code segments, and wherein at least one of the plurality of code segments comprises a licensing attribute embedded in metadata of the non-fungible token corresponding to the at least one code segment.

7. The computer program product of claim 6, wherein, upon a second condition where the language of the code segment is not known, the code further causes the apparatus to:

pre-process the code segment, wherein pre-processing includes processing the code segment to a predetermined input length by tokenizing the code segment and padding or truncating a sequence of tokens to the predetermined input length;

identify, using a convolution neural network, the language of the code segment, wherein the convolution neural network is a hierarchical stacked convolution network configured to repetitively reduce the code segment and extract features at each repetition; and transform the code segment via the transformer neural network to the common code base.

8. The computer program product of claim 6, wherein upon third-party retrieval of the non-fungible token, an originator of the code segment is notified.

9. The computer program product of claim 6, wherein upon a fourth condition of the level of similarity being above a predetermined threshold, the code segment is not tokenized.

10. The computer program product of claim 6, wherein the Euclidean distance is output from a twinning network.

11. A method for identification, tokenization, and dependency mapping of source code in a network environment, the method comprising:

retrieving a code segment from a code repository;

determining a language of the code segment, wherein upon a first condition where the language of the code segment is known, the code segment is transformed via a transformer neural network to a common code base;

generating a feature vector by extracting features of the code segment using an abstract syntax tree based neural network, wherein the feature vector is a reduced dimension;

storing the feature vector in a feature vector database comprising stored feature vectors;

retrieving, from the feature vector database based on metadata of the feature vector, a plurality of similar stored feature vectors;

establishing, using a Euclidean distance, a level of similarity between the feature vector and the plurality of similar stored feature vectors;

tokenizing, upon a third condition of the level of similarity is below a predetermined threshold, the feature vector as a non-fungible token; and inserting the non-fungible token into a directed acyclic graph as a node, wherein the directed acyclic graph comprises edges between a plurality of related nodes as a representation of dependencies between a plurality of related non-fungible tokens, wherein the edges represent code segment dependency relationships between underlying code segments associated with the related non-fungible tokens, wherein the directed acyclic graph represents interdependencies of a plurality of code segments, and wherein at least one of the plurality of code segments comprises a licensing attribute embedded in metadata of the non-fungible token corresponding to the at least one code segment.

12. The method of claim 11, wherein upon a second condition where the language of the code segment is not known, the method further comprises:

pre-processing the code segment, wherein pre-processing includes processing the code segment to a predetermined input length by tokenizing the code segment and padding or truncating a sequence of tokens to the predetermined input length;

identifying, using a convolution neural network, the language of the code segment, wherein the convolution neural network is a hierarchical stacked convolution network configured to repetitively reduce the code segment and extract features at each repetition; and transforming the code segment via the transformer neural network to the common code base.

13. The method of claim 11, wherein upon third-party retrieval of the non-fungible token, an originator of the code segment is notified.

14. The method of claim 11, wherein upon a fourth condition of the level of similarity being above a predetermined threshold, the code segment is not tokenized.

15. The method of claim 11, wherein the Euclidean distance is output from a twinning network.

* * * * *